US009360985B2

(12) United States Patent
Sundstrom

(10) Patent No.: US 9,360,985 B2
(45) Date of Patent: Jun. 7, 2016

(54) METHOD AND SYSTEM FOR AUTOMATICALLY LINKING A CURSOR TO A HOTSPOT IN A HYPERVIDEO STREAM

(75) Inventor: Robert J. Sundstrom, Cary, NC (US)

(73) Assignee: SCENERA TECHNOLOGIES, LLC, Portsmouth, NH (US)

( * ) Notice: Subject to any disclaimer, the term of this patent is extended or adjusted under 35 U.S.C. 154(b) by 2688 days.

(21) Appl. No.: 11/769,280

(22) Filed: Jun. 27, 2007

(65) Prior Publication Data

US 2009/0007023 A1    Jan. 1, 2009

(51) Int. Cl.
| | | |
|---|---|---|
| G06F 3/048 | (2013.01) | |
| G06F 3/0481 | (2013.01) | |
| G06F 17/30 | (2006.01) | |
| H04N 21/2343 | (2011.01) | |
| H04N 21/4725 | (2011.01) | |
| H04N 21/858 | (2011.01) | |
| G06F 3/0488 | (2013.01) | |

(52) U.S. Cl.
CPC ........ *G06F 3/0481* (2013.01); *G06F 17/30855* (2013.01); *H04N 21/234318* (2013.01); *H04N 21/4725* (2013.01); *H04N 21/8583* (2013.01); *G06F 3/04812* (2013.01); *G06F 3/04883* (2013.01)

(58) Field of Classification Search
CPC .............. G06F 3/04812; G06F 3/0481; G06F 3/04883; G06F 17/30855; H04N 21/234318; H04N 21/4725; H04N 21/8583
USPC ......................... 715/857, 858, 719
See application file for complete search history.

(56) References Cited

U.S. PATENT DOCUMENTS

| | | | |
|---|---|---|---|
| 5,327,528 A | | 7/1994 | Hidaka et al. |
| 5,508,717 A | | 4/1996 | Miller |
| 5,539,871 A | | 7/1996 | Gibson |
| 5,708,845 A | * | 1/1998 | Wistendahl et al. .......... 715/202 |
| 5,786,805 A | | 7/1998 | Barry |
| 5,805,165 A | * | 9/1998 | Thorne et al. ................. 715/823 |
| 5,819,092 A | * | 10/1998 | Ferguson et al. ............. 717/113 |
| 6,031,531 A | * | 2/2000 | Kimble ........................ 715/862 |
| 6,075,537 A | * | 6/2000 | Adapathya et al. ........... 715/760 |

(Continued)

OTHER PUBLICATIONS

"Clickable Video Hypervideo Video Hotspotting," [online] VideoClix, © 2007 [retrieved on May 22, 2007] Retrieved from the Internet: <URL: http://www.elinetech.com/videoclix_product_tour.html> 4 pages.

(Continued)

*Primary Examiner* — Tuyetlien T Tran

(57) ABSTRACT

Automatically linking a cursor to a hotspot in a hypervideo stream comprising a plurality of video frames that are associated with at least one selectable hotspot include receiving a hypervideo stream of a first video frame associated with a selectable hotspot in a first activiation region of the first video frame, and determining whether a first position of a cursor is substantially within the first activiation region corresponding to the selectable hotspot. The cursor is associated with the selectable hotspot when the first position of the cursor is substantially within the first activiation region corresponding to the selectable hotspot in the first video frame. The hypervideo stream of a second video frame associated with the selectable hotspot in a second activation region different from the first activation region is received, and the cursor is automatically moved to a second position in the second video frame based on the association.

15 Claims, 4 Drawing Sheets

(56) References Cited

U.S. PATENT DOCUMENTS

| | | | |
|---|---|---|---|
| 6,154,771 A * | 11/2000 | Rangan et al. | 709/217 |
| 6,169,573 B1 * | 1/2001 | Sampath-Kumar et al. | 348/169 |
| 6,175,840 B1 * | 1/2001 | Chen et al. | 715/210 |
| 6,339,440 B1 | 1/2002 | Becker et al. | |
| 6,462,763 B1 * | 10/2002 | Mostyn | 715/856 |
| 6,570,587 B1 * | 5/2003 | Efrat et al. | 715/723 |
| 6,714,215 B1 * | 3/2004 | Flora et al. | 715/716 |
| 6,788,284 B1 | 9/2004 | Culler | |
| 6,912,726 B1 * | 6/2005 | Chen et al. | 725/113 |
| 7,137,068 B1 | 11/2006 | Robin | |
| 2002/0161909 A1 * | 10/2002 | White | 709/231 |
| 2003/0023459 A1 * | 1/2003 | Shipon | 705/2 |
| 2003/0189670 A1 * | 10/2003 | Kennedy et al. | 348/601 |
| 2004/0021684 A1 * | 2/2004 | Millner | 345/719 |
| 2004/0189714 A1 | 9/2004 | Fox et al. | |
| 2004/0233233 A1 * | 11/2004 | Salkind et al. | 345/719 |
| 2008/0201734 A1 * | 8/2008 | Lyon et al. | 725/34 |

OTHER PUBLICATIONS

Koenen, R., ed., "Overview of the MPEG-4 Standard," International Organization for Standardisation Organization Internationale De Normalization ISO/IEC JTC1/SC29/WG11 Coding of Moving Pictures and Audio, N4668, Mar. 2002, 78 pages.

Worden, A., et al., "Making Computers Easier for Older Adults to Use: Area Cursors and Sticky Icons," CHI Atlanta, GA, 1997, Copyright 1997 ACM 0-8979 1-802-9/97/03, Mar. 22-27, 1997, 6 pages.

Grossman, T., et al., "The Bubble Cursor: Enhancing Target Acquisition by Dynamic Resizing of the Cursor's Activation Area," CHI 2005, Copyright 2005 ACM 1-58113-998-5/05/0004, 04/2-7, 2005, 10 pages.

\* cited by examiner

METHOD AND SYSTEM FOR AUTOMATICALLY LINKING A CURSOR TO A HOTSPOT IN A HYPERVIDEO STREAM

CROSS-REFERENCE TO RELATED APPLICATIONS

The present application is related to co-pending U.S. patent application Ser. No. 11/856,989, entitled "METHOD AND SYSTEM FOR AUTOMATICALLY ASSOCIATING A CURSOR WITH A HOTSPOT IN A HYPERVIDEO STREAM USING A VISUAL INDICATOR," filed on Sep. 18, 2007, commonly owned with the present application. In addition, the present application is also related to U.S. patent application Ser. No. 11/857,767, entitled "METHOD AND SYSTEM FOR PRESENTING A HOTSPOT IN A HYPERVIDEO STREAM," filed on Sep. 19, 2007, and commonly owned with the present application.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

Hypervideo is a displayed video stream that includes user selectable anchors, referred to as "hotspots," that are linked to ancillary information. When a user views a hypervideo clip and selects the hotspot, the user can navigate from the video clip to the linked ancillary information. For example, a hotspot can be associated with an element in the video clip, such as a red automobile, and when selected, additional information about the automobile can be presented to the user, or a different video clip or a different segment of the same clip can be shown to the user.

In order to associate hotspots with elements in a hypervideo stream, it is necessary to track the position of the individual elements within the video clips used. Thus, when the exemplary red automobile is moving, the hypervideo media player system must be able to determine when the hotspot associated with the automobile has been selected, regardless of where it is on the screen when the selection is made. For video clips created artificially, e.g., by computer graphics, element tracking is relatively simple because the position of an element is specified on a coordinate system and that information can be then used to track the element. For video clips created from or based on live footage, however, element tracking is more complex. The video clip comprises a plurality of video frames, where each frame represents a still picture or "snapshot" of a particular moment in time. While each video frame contains visual information sufficient to permit the human brain to distinguish individual elements, such visual information does not generally enable a computer system to recognize the elements.

Nevertheless, several hypervideo authoring systems have been developed that support element tracking through the generation of hotspots that move with the element. For example, FIGS. 1A, 1B and 1C illustrate three (3) exemplary video frames of a hypervideo stream that includes moving elements. In FIG. 1A, the first video frame 10a includes a first element, e.g., an automobile, that is associated with a first hotspot 12a. As is shown, the first hotspot 12a can be a defined region that is similar in shape and size of the first element with which it is associated.

For the sake of clarity, the first hotspot 12a is represented by a rectangular box that generally encompasses the first element. In other instances, the defined region of a hotspot associated with an element is not displayed to the user. Rather, the appearance of the cursor 100 can change when the cursor position is within a hotspot. For example, when the cursor 100 is within a hotspot, the cursor 100 can appear as a pointing finger, otherwise the cursor 100 can appear as an arrow. Typically, when a viewer places the cursor 100 or pointer over the first element and selects the first element, the viewer effectively activates the associated first hotspot 12a. In this example, when the first hotspot 12a is activated, information 14a about the first element associated with the first hotspot 12a is presented.

In FIG. 1B, the second video frame 10b includes the first element and a second element, e.g., a white automobile, that is also associated with a second hotspot 12b. As is shown, the first hotspot 12a is in a different location and has a different shape/size because the first hotspot 12a is tracking the location and shape/size of the first element. Generally, because the first element is "moving" away from the camera, its relative size is decreasing and thus, the size of the first hotspot 12a is also decreasing. As the size of the hotspot 12a decreases with each successive video frame (assuming the first element continues to travel away from the camera), it can be increasingly more difficult for the viewer to place the cursor 100 on the first element to activate the associated first hotspot 12a. Thus, in FIG. 1C, while the viewer has placed the cursor 100 near the first element and selected what the viewer thinks is the first element, the cursor placement and selection actually has activated the second hotspot 12b, which is associated with the second element, e.g., the rear automobile. As a result, information 14b about the second element associated with the second hotspot 12b is presented.

For some, positioning the cursor 100 over a stationary graphical display element, such as an icon or hypertext link, can be difficult. In some instances, a user may exhibit diminished visual or physical abilities, or lack training and practice to correctly position the cursor 100. This difficulty is exacerbated in a hypervideo stream because elements captured in video clips, and their associated hotspots, are typically moving, and even if the element itself is physically stationary, the camera may be panning or zooming, thereby resulting in perceived movement.

Moreover, difficulties in positioning the cursor 100 properly can be attributable to the computer system itself. For example, a computer display can provide a high density presentation of material, rendering graphical display elements relatively small. Similarly, small computer displays, such as those for palm-held devices, may make graphical display elements difficult to select. In addition to user abilities and hardware limitations, the content displayed may include small elements, such as jewelry, with correspondingly small hotspots, making user selection with a pointing device difficult.

As illustrated above, inaccurate cursor positioning can result in mistakenly activating a hotspot associated with another element. With hypervideos, this mistake is particularly frustrating because the video stream continues for a specified time. To correct the mistake, the user must either replay the video clip, or stop the presentation of the video clip and rewind it to some point. Moreover the mistakenly activated hotspot can produce completely unintended results, which can be detrimental to the user. For example, in FIG. 1C, the viewer can mistakenly believe that he is reading information about the first element, e.g., the front automobile, when in fact, the information pertains to the second element, e.g., the rear automobile.

Accordingly, there exists a need for methods, systems, and computer program products for helping a user to track and activate a hotspot associated with an element in a hypervideo.

SUMMARY

Methods and systems are described for automatically linking a cursor to a hotspot in a hypervideo stream comprising a plurality of video frames that are associated with at least one selectable hotspot. One method includes receiving a hypervideo stream of a first video frame that is associated with a selectable hotspot in a first activation region of the first video frame, and determining whether a first position of a cursor is substantially within the first activation region corresponding to the selectable hotspot. The cursor is associated with the selectable hotspot when the first position of the cursor is substantially within the first activation region. The method also includes receiving the hypervideo stream of a second video frame that is associated with the selectable hotspot in a second activation region different from the first activation region, and automatically moving the cursor to a second position substantially within the second activation region in the second video frame based on the association between the cursor and the selectable hotspot.

In another aspect of the subject matter disclosed herein, a system for automatically linking a cursor to a hotspot in a hypervideo stream includes means for receiving a hypervideo stream of a first video frame that is associated with a selectable hotspot in a first activation region of the first video frame and for receiving a second video frame that is associated with the selectable hotspot in a second activation region different from the first activation region, means for determining whether a first position of a cursor is substantially within the first activation region corresponding to the selectable hotspot, means for associating the cursor with the selectable hotspot when the first position of the cursor is substantially within the first activation region, and means for automatically moving the cursor to a second position substantially within the second activation region in the second video frame based on the association between the cursor and the selectable hotspot.

In another aspect of the subject matter disclosed herein, a system for automatically linking a cursor to a hotspot in a hypervideo stream includes a hypermedia player component configured for receiving a hypervideo stream of a first video frame that is associated with a selectable hotspot in a first activation region of the first video frame and for receiving a second video frame that is associated with the selectable hotspot in a second activation region different from the first activation region, and a graphical user interface manager component for processing a position of a cursor. The hypermedia player component is configured for determining whether a first position of the cursor is substantially within the first activation region corresponding to the selectable hotspot, and for associating the cursor with the selectable hotspot when the first position of the cursor is substantially within the first activation region corresponding to the selectable hotspot in the first video frame. The graphical user interface manager component is configured for automatically moving the cursor to a second position substantially within the second activation region in the second video frame based on the association between the cursor and the selectable hotspot.

In another aspect of the subject matter disclosed herein, a computer readable medium containing a computer program, executable by a machine, for automatically linking a cursor to a hotspot in a hypervideo stream includes executable instructions for receiving a hypervideo stream of a first video frame that is associated with a selectable hotspot in a first activation region of the first video frame, determining whether a first position of a cursor is substantially within the first activation region corresponding to the selectable hotspot, associating the cursor with the selectable hotspot when the first position of the cursor is substantially within the first activation region, receiving the hypervideo stream of a second video frame that is associated with the selectable hotspot in a second activation region different from the first activation region, and automatically moving the cursor to a second position substantially within the second activation region in the second video frame based on the association between the cursor and the selectable hotspot.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which.

DETAILED DESCRIPTION

Methods, systems, and computer program products for automatically linking a cursor to a hotspot in a hypervideo stream are disclosed. According to one embodiment, a hypervideo stream that includes at least one selectable hotspot is received by a hypermedia player in a client device and presented to a user. The hypermedia player is configured to determine when the cursor 100, controlled by the user, is positioned within a region associated with a hotspot. When such a determination is made, the hypermedia player links the cursor 100 to the hotspot such that the cursor 100 automatically tracks the hotspot, and therefore the element associated with the hotspot. By linking the cursor 100 to the hotspot, the user has time to consider whether to activate the hotspot without needing to manually track the element while it moves. When a selection is made, the user can be assured that the activated hotspot is associated with the intended element.

Figure 1A:
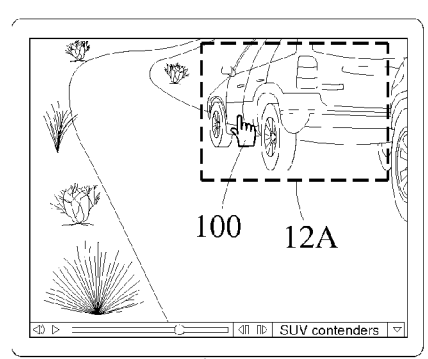
FIGS. 1A-1C illustrate a plurality of video frames of an exemplary hypervideo stream including hotspots according to an exemplary embodiment.
Figure 1B:
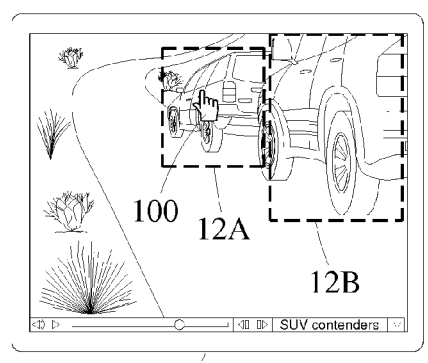
Figure 1C:
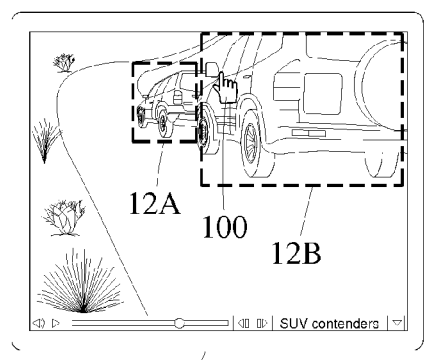
Figure 2:
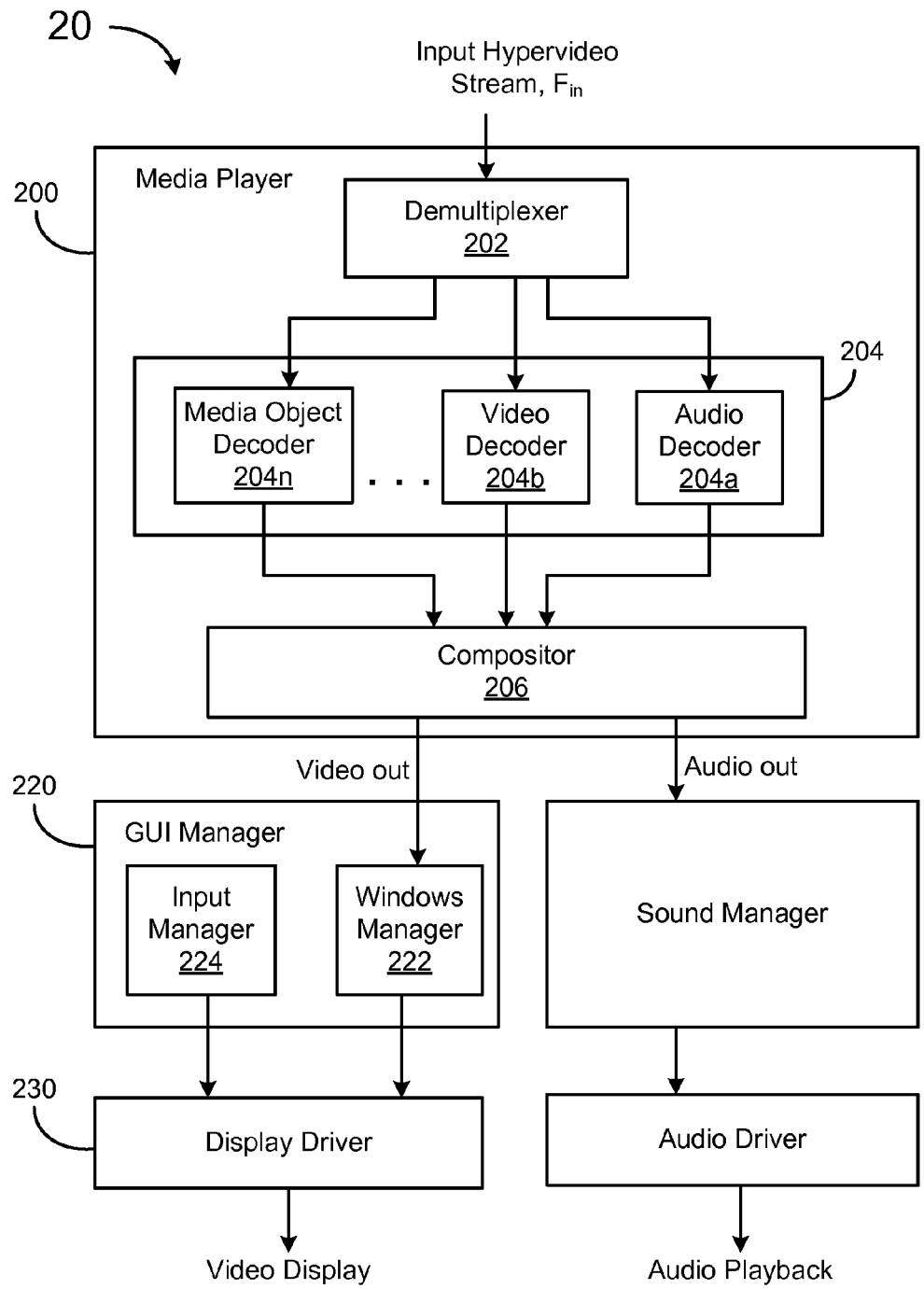
FIG. 2 is a block diagram illustrating a typical client device including a media player according to one embodiment.

FIG. 2 is a block diagram illustrating a standard client device according to one embodiment. The device 20 includes a media player 200, a graphical user interface (GUI) manager component 220, a display driver 230 and other components related to presenting a hypervideo stream to the user. In one embodiment, the media player 200 can be an MPEG-4 media player, as described in "Overview of the MPEG-4 Standard," Apr. 19, 2007 (see—http://www.chiariglione.org/mpeg/standards/mpeg-4/mpeg-4.htm). In this embodiment, the media player 200 includes a demultiplexer 202, a decoder 204, comprising a set of component-specific decoders 204a, 204b, 204n, and a compositor 206.

As stated above, an audio/visual (AV) input hypervideo stream comprises a sequence of video frames, each of which include visual and audio data capturing a moment in time. Each video frame of the hypervideo stream is received by the demultiplexer 202, which separates the stream into a plurality of component signals. Typically, each component signal is coded, e.g., compressed, for efficient transmission and is received by a corresponding component-specific decoder 204a, 204b, 204n for processing. For example, an audio component signal is received and processed by the audio decoder 204a, a video component signal is received and processed by the video decoder 204b, and a media object component signal is received and processed by the media object decoder 204n. During the decoding process, data in an audio/visual object is recovered from its encoded form, e.g., decompressed, and the original AV object is reconstructed. The decoders 204a, 204b, 204n pass the reconstructed AV objects and scene description information to the compositor 206, which synchronizes the reconstructed AV objects and renders the video frame for presentation to the user.

After the compositor 206 synchronizes the AV objects and renders the video frame, the compositor 206 passes the video frame to a windows manager 222 within the GUI manager component 220. The windows manager 222 manages the placement and appearance of windows on the display screen. It renders the video frame received from the compositor 206 into a window assigned to the video, composites the video window with other windows and other visual components and provides the resulting screen to the display driver 230 for presentation to the user.

As is shown, the GUI manager component 220 also includes an input manager 224. The input manager 224 is communicatively coupled to a user input device (not shown), e.g., a mouse, keypad, or similar user input mechanism. The input manager 224 can receive signals from the input device regarding a position of the cursor 100, and provides instructions to the display driver 230 to move the cursor 100 according to the user's actions. Typically, the input manager 224 is responsive only to commands issued by the user via the input device. Thus, the input manager 224 can provide no assistance to the user who is attempting to use the cursor 100 to track a moving element in a video clip.

Figure 3:
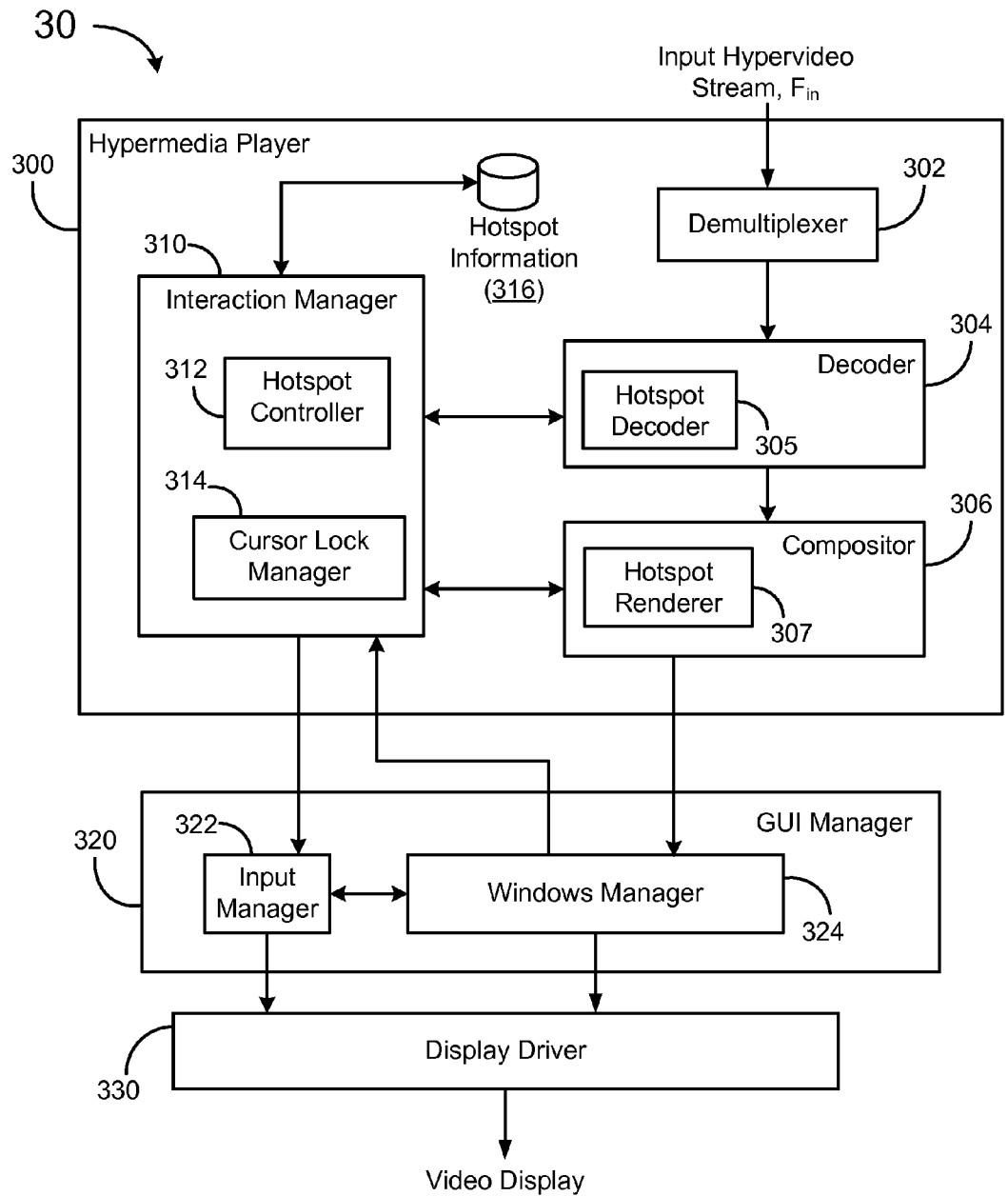
FIG. 3 is a block diagram illustrating a client device including an exemplary system for automatically linking a cursor to a hotspot in a hypervideo stream according to an exemplary embodiment.

FIG. 3 is a block diagram illustrating a client device including an exemplary system for automatically linking a cursor 100 to a hotspot in a hypervideo stream according to an exemplary embodiment. In one embodiment, the device 30 includes a hypermedia player 300, a GUI manager component 320 and a display driver 330. The hypermedia player 300, in this embodiment, includes a demultiplexer 302, a decoder 304, comprising a hotspot decoder 305, and a compositor 306, including a hotspot renderer 307.

Each video frame of the input hypervideo stream is received by the demultiplexer 302, which separates the video frame into its encoded component parts, including the audio component signal, the video component signal, and media objects including at least one hotspot media object. A hotspot media object defines a hotspot and is encoded separately from, but associated with, the video frame. The hotspot decoder 305 receives the encoded hotspot media object, decodes it, and reconstructs the hotspot media object. In one embodiment, the hotspot media object can include some or all of the following hotspot information:

Action information, such as a URL to be launched when the hotspot is selected;
Hover information to be displayed when the cursor hovers over the hotspot for a predetermined time period;
Location information that defines where an activation region associated with the hotspot is located in the video frame;
Visual information, such as an icon that can be used to represent the hotspot, and
Three-dimensional information that indicates in which spatial plane the activation region of the hotspot is located in relation to other hotspot activation regions.

The reconstructed hotspot media object is passed to the hotspot renderer 307 in the compositor 306 so that the corresponding hotspot can be properly composed with the remainder of the scene and rendered to the user.

According to an exemplary embodiment, the hypermedia player 300 includes an interaction manager component 310 configured for managing user interaction with hotspots in the presented hypervideo stream. In one embodiment, the interaction manager component 310 is configured to detect when the user has placed the cursor 100 within a region associated with a hotspot and to lock the cursor 100 onto the hotspot automatically so that the cursor 100 automatically tracks the hotspot as it moves from video frame to video frame.

Figure 4:
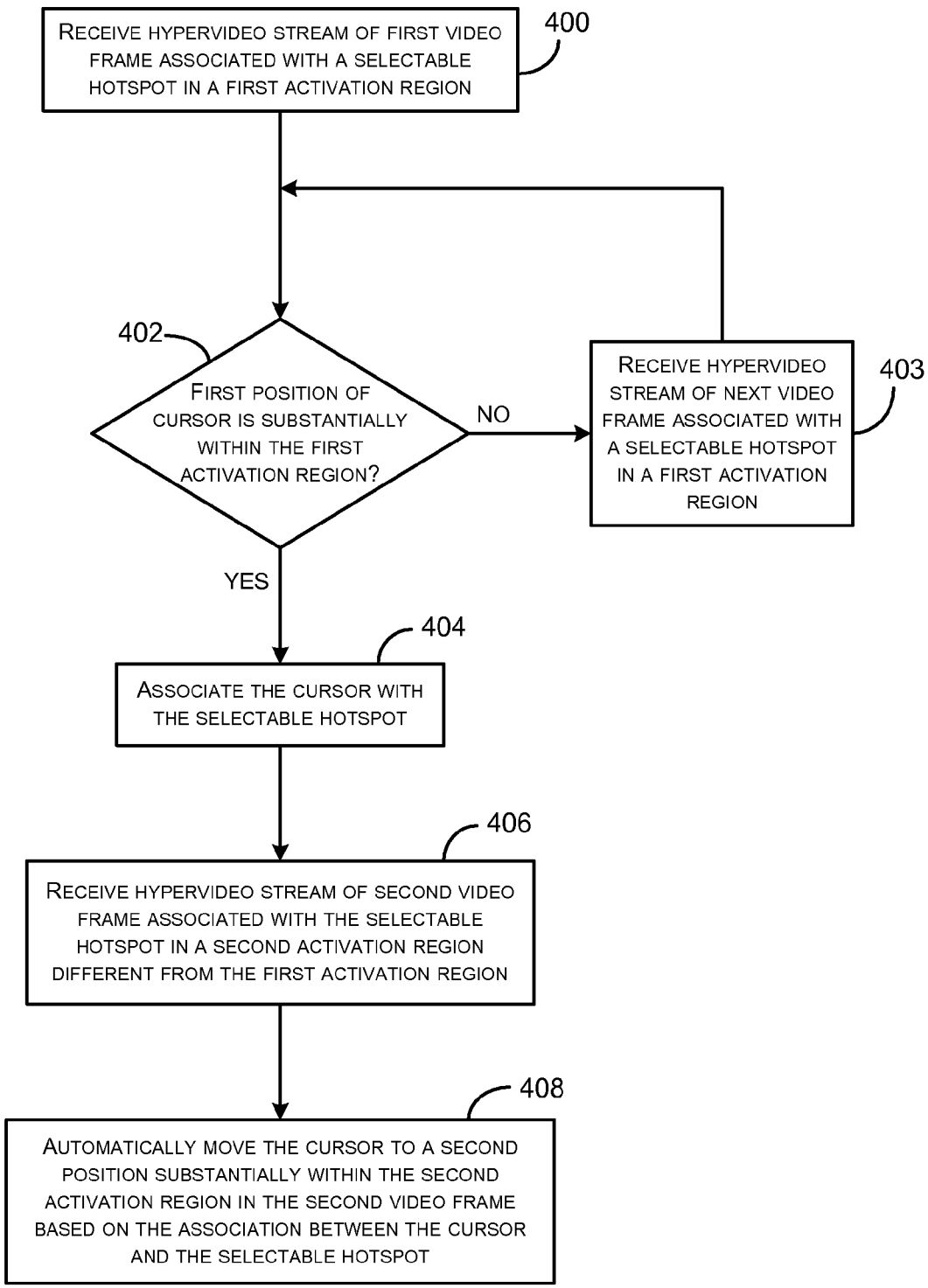
FIG. 4 is a flowchart illustrating a method for automatically linking a cursor to a hotspot in a hypervideo stream according to an exemplary embodiment.

FIG. 4 is a flowchart illustrating an exemplary method for automatically linking a cursor 100 to a hotspot in a hypervideo stream according to one embodiment. Referring to FIG. 3 and FIG. 4, the hypermedia player 300 receives a hypervideo stream of a first video frame associated with a selectable hotspot in a first activation region of the first video frame (block 400). According to an exemplary embodiment, the hypermedia player 300 includes means for receiving the hypervideo stream of the first video frame. For example, the demultiplexer 302 in the hypermedia player 300 can be configured to perform this function.

In one embodiment, the demuliplexer 302, as stated above, separates the hypervideo stream into a plurality of component parts including one or more hotspot media objects corresponding to one or more selectable hotspots. The hotspot media objects are decoded by the hotspot decoder 305, which then passes the decoded hotspot media objects to the hotspot renderer 307 in the compositor 306. The compositor 306 composes the hotspots with the other decoded components and renders the video frame to the user.

According to an exemplary embodiment, the decoded hotspot media objects are also passed to a hotspot controller component 312 in the interaction manager component 310, which manages and stores the hotspot media objects for the hypervideo stream in a hotspot list. In one embodiment, each hotspot media object is associated with a hotspot identifier. The hotspot identifier can be provided by the hotspot decoder 305 in one embodiment, or by the hotspot controller component 312 in another embodiment. The hotspot controller component 312 stores the hotspot identifier and the hotspot information of the hotspot media object in the hotspot list in a data store 316.

When new hotspot information relating to an existing hotspot media object is received and the hotspot identifier is provided by the decoder 305, the hotspot controller component 312 can use the received hotspot identifier to locate and update the stored hotspot information in the hotspot list. In another embodiment, when the hotspot identifier is not provided by the decoder 305, the hotspot controller component 312 can compare a portion of the received hotspot information, e.g., the action information or the hover information, to the stored hotspot information to determine to which hotspot media object on the list the received hotspot information relates. For instance, the action information of a hotspot media object can be used to determine a match because this information typically does not change. When the hotspot controller component 312 is not able to determine a match, the hotspot controller component 312 can associate a new hotspot identifier with the received hotspot information and add the new hotspot identifier and information to the hotspot list.

After the first video frame has been received and presented to the user, the exemplary method continues by determining whether a first position of a cursor 100 is substantially within the first activation region corresponding to the selectable hotspot (block 402). According to an exemplary embodiment, the hypermedia player 300 includes means for making this determination. For example, the hotspot controller component 310 in the hypermedia player 300 can be configured to receive cursor position information from an input manager 322 via a windows manager 324 in the GUI manager component 320 and to determine whether a first position of the cursor 100 is substantially within the first activation region.

In one embodiment, when the cursor position information is received, the hotspot controller component 310 compares the cursor position information to the location information of the hotspot media objects in the hotspot list and determines whether the cursor 100 is within an activation region associated with a hotspot. In one embodiment, the cursor 100 can be considered to be within an activation region of a hotspot when the cursor 100 position is at or within the boundaries of the activation region. When two or more activation regions of two or more hotspots are adjoining or overlapping, the determination can be based on other factors. For example, when the cursor 100 position is within an overlapping section of first and second activation regions associated with first and second hotspots, the cursor 100 can be considered to be within the activation region of the first hotspot when the cursor 100 position is closer to a center of the first activation region than to a center of the second activation region. Alternatively, the cursor 100 can be considered to be within neither the first nor the second activation regions, or the three-dimensional information can be used and the cursor 100 can be considered to be within the activation region that is "on top".

When the position of the cursor 100 is not substantially within the activation region corresponding to a selectable hotspot (block 402), no action is taken. The hypervideo stream of a next video frame is received (block 403), presented to the user, and the hotspot controller component 310 determines again whether a position of the cursor 100 is substantially within the activation region corresponding to a selectable hotspot.

When it is determined that the position of the cursor 100 is substantially within the first activation region corresponding to the selectable hotspot (block 402), the cursor 100 is associated with the selectable hotspot (block 404). According to an exemplary embodiment, the hypermedia player 300 includes means for associating the cursor 100 with the selectable hotspot. For example, a cursor lock manager component 314 in the hypermedia player 300 can be configured to perform this function.

In one embodiment, when the first position of the cursor 100 is determined to be substantially within the first activation region corresponding to the selectable hotspot in the first video frame, the hotspot controller component 310 can notify the cursor lock manager component 314 and pass the hotspot identifier associated with the hotspot media object corresponding to the selectable hotspot to the cursor lock manager component 314. The cursor lock manager component 314 receives and records the hotspot identifier in a temporary storage buffer or cache (not shown). Optionally, the first position of the cursor 100 can also be received and recorded.

Next, the hypermedia player 300 receives a hypervideo stream of a second video frame associated with the selectable hotspot in a second activation region different from the first activation region (block 406). For example, the second activation region of the hotspot in the second video frame can be different from the first activation region in the first video frame when the hotspot tracks a moving element in the hypervideo stream. According to an exemplary embodiment, the hypermedia player 300 includes means for receiving the hypervideo stream of the second video frame. For example, the demultiplexer 302 can be configured to perform this function.

In an exemplary embodiment, the hypervideo stream of the second video frame is processed in the manner described above. That is, the demuliplexer 302 receives the hypervideo stream and separates it into a plurality of component parts including one or more hotspot media objects corresponding to one or more selectable hotspots. The hotspot media objects are decoded by the hotspot decoder 305, which then passes the decoded hotspot media objects to the hotspot renderer 307 for presentation to the user, and to the hotspot controller component 312 for updating and/or storing the hotspot information of the hotspot media objects in the data store 316.

In this embodiment, the hypervideo stream of the second video frame includes a hotspot media object associated with the selectable hotspot, which is an existing hotspot media object in the hotspot list. Accordingly, the hotspot controller component 312 will receive new hotspot information for the selectable hotspot, which, includes new location information defining where the second activation region is located in the second video frame. The existing location information of the selectable hotspot will be updated with the new location information.

In one exemplary embodiment, when the hotspot information of an existing hotspot media object has been updated, the hotspot controller component 312 can notify the cursor lock manger component 314 and can pass the hotspot identifier of the updated hotspot media object to the cursor lock manager component 314. The cursor lock manager component 314 receives the hotspot identifier and can determine whether the received hotspot identifier matches the recorded hotspot identifier. When such a match is not determined, e.g., because the cursor 100 is not associated with the hotspot associated with the received hotspot identifier, no action is taken.

When the received hotspot identifier matches the recorded hotspot identifier, this indicates that the cursor 100 is associated with the hotspot corresponding to the received hotspot identifier, i.e., the received hotspot identifier is associated with the selectable hotspot. In one embodiment, the cursor lock manager component 314 can retrieve the new location information that defines where the second activation region is located in the second video frame, and can determine a second position of the cursor 100 based on the new location information.

In one embodiment, the cursor lock manager component 314 can analyze the new location information and determine the second position to be within the second activation region. For example, the cursor lock manager component 314 can identify an edge of the second activation region closest to a current cursor 100 position, or a center of the second activation region, which can be a geometric center, a center of gravity, or a visual center. The second position can then be set as the closest edge or the center of the second activation region. In another embodiment, the determination of the second position can be based on the recorded first cursor position and the new location information. For example, when the first position of the cursor 100 is determined to be outside of the second activation region, the second position can be set as the closest edge or the center of the second activation region. When the first position of the cursor 100, however, is determined to be within the second action region, the second position can be set as the first position.

When the second position is determined, the cursor 100 is automatically moved to the second position substantially within the second activation region in the second video frame based on the association between the cursor 100 and the selectable hotspot (block 408). According to an exemplary embodiment, the hypermedia player 300 includes means for automatically moving the cursor 100 to the second position. For example, the cursor lock manager component 314 can be configured to perform this function.

In one embodiment, the cursor lock manager component 314 can transmit an input command to the input manager 322, simulating an input command from a user input device (not shown). The input command can cause the input manager 322 to move the cursor 100 to the second position.

In another embodiment, the cursor lock manager component 314 can transmit the input command directly to the windows manager 324. The windows manager 324 can refresh the display with the cursor 100 in the second position. In this embodiment, a typical windows manager 324 usually will not accept an input command from an application program, such as the interaction manager component 310, due to security concerns. Nevertheless, these concerns can be addressed, for example, by configuring the windows manager 324 to accept such input commands only when the cursor 100 is within the window controlled by the interaction manager 310. In addition, such a feature could be provided only to a privileged set of application programs.

According to an exemplary embodiment, once the cursor 100 is associated with the selectable hotspot, the interaction manager component 310 automatically moves the cursor 100 so that it remains substantially within the activation region corresponding to the selectable hotspot associated with the cursor 100. For example, even when the element with which the hotspot is associated is completely or partially covered by another element, the cursor 100 remains associated with the hotspot and the user can activate the hotspot without the risk of activating another hotspot that overlaps or completely encompasses the associated hotspot. In addition, when the cursor 100 is associated with the selectable hotspot for a first predetermined time period and has not been activated, i.e., selected, the hover information of the hotspot media object corresponding to the selectable hotspot can be provided to the user. In this manner, the user can easily view the hover information and select the associated hotspot without worrying about manually tracking the hotspot.

In some instances, the selectable hotspot is not associated with subsequently received video frames. For example, when the element associated with the hotspot disappears from the video clip because the camera pans away from the element, the subsequent video frames will not be associated with the selectable hotspot. In this case, the association between the cursor 100 and the selectable hotspot can be maintained, in one embodiment, for a second predetermined time period even when the selectable hotspot is not associated with subsequently received video frames. Because the association between the cursor 100 and the hotspot is maintained, the user can still activate the hotspot within the second predetermined time period even when the element and the hotspot are no longer presented to the user. Moreover, when the element reappears in the video clip within the second predetermined time period, the cursor 100 is automatically moved to a position substantially within the activation region of the selectable hotspot corresponding to the element.

In an exemplary embodiment, the cursor 100 can be associated with the selectable hotspot until the second predetermined time period expires, or until another predetermined time period expires. Alternatively, or additionally, the cursor 100 can be disassociated with the selectable hotspot in response to a command, a request or an indication to unlock the cursor 100.

Although embodiments have been described using a hypermedia player 300 configured for MPEG-4 encoded video streams, other video stream encodings and media players can be used, such as Quicktime® or Flash®. For example, QuickTime® offers support for sprites, which are object-based animations in a layer that is separate from, but synchronized with, the video layer. In MPEG-4 terminology, a sprite is a media object separate from the video media object. The sprite animations can be included in the user presentation, or not, by setting of a visibility flag. Wired sprites are sprites that react to user interaction and respond to user events such as mouseover (hover) and mouse-down (selection). Wired sprites are aware of their own boundaries and track when the user is potentially interacting with them. They also keep track of which actions to perform for which user events. Flash® supports interactivity with ActionScripts, which handle animations and mouse events such as selection.

Through aspects of the embodiments described, a cursor 100 is linked to a hotspot so that the cursor 100 automatically tracks the position of the hotspot. By linking the cursor 100 to the hotspot, the user has time to consider whether to activate the hotspot without needing to manually track the element while it moves. It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more processors, or by a combination of both.

Moreover, executable instructions of a computer program for carrying out the methods described herein can be embodied in any machine or computer readable medium for use by or in connection with an instruction execution machine, system, apparatus, or device, such as a computer-based or processor-containing machine, system, apparatus, or device, that can read or fetch the instructions from the machine or computer readable medium and execute the instructions.

As used here, a "computer readable medium" can be any means that can contain or store the computer program for use by or in connection with the instruction execution machine, system, apparatus, or device. The computer readable medium can be, for example, but not limited to, an electronic, magnetic, optical, electromagnetic, infrared, or semiconductor machine, system, apparatus, or device. More specific examples (a non-exhaustive list) of the computer readable medium can include the following: intranet, a portable computer diskette, a random access memory (RAM), a read only memory (ROM), an erasable programmable read only memory (EPROM or Flash memory), a portable compact disc (CD), a portable digital video disc (DVD), and the like.

Thus, the subject matter described herein can be embodied in many different forms, and all such forms are contemplated to be within the scope of what is claimed. It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for automatically linking a cursor to a hotspot in a hypervideo stream, wherein the hypervideo stream comprises a plurality of video frames that are associated with at least one selectable hotspot, the method comprising:
  receiving a hypervideo stream of a first video frame, the first video frame associated with a selectable hotspot in a first activation region of the first video frame;
  determining whether a first position of a cursor is substantially within the first activation region corresponding to the selectable hotspot;
  associating the cursor with the selectable hotspot when the first position of the cursor is substantially within the first activation region corresponding to the selectable hotspot in the first video frame;
  receiving the hypervideo stream of a second video frame, the second video frame associated with the selectable hotspot in a second activation region, wherein the second activation region is different from the first activation region;
  automatically moving the cursor to a second position substantially within the second activation region in the second video frame based on the association between the cursor and the selectable hotspot, wherein the second position is at a closest edge of the second activation region;
  receiving the hypervideo stream of a third video frame, wherein the selectable hotspot is not associated with the third video frame;
  maintaining the association between the cursor and the selectable hotspot for a second predetermined time period; and
  performing an action corresponding to the selectable hotspot when the selectable hotspot is activated within the second predetermined time period.

2. The method of claim 1 wherein after receiving the hypervideo stream of the first video frame the method further includes:
  separating the hypervideo stream into a plurality of component parts including a hotspot media object corresponding to the selectable hotspot, wherein the hotspot media object includes hotspot information comprising location information, including three-dimensional information, defining where the activation region corresponding to the selectable hotspot is located in the video frame, and at least one of action information indicating the action to perform when the hotspot is activated, hover information to be provided when the cursor is positioned substantially within the activation region corresponding to the hotspot for a first predetermined time period, and visual information associated with the hotspot.

3. The method of claim 2 wherein after separating the hypervideo stream into the plurality of component parts including the hotspot media object corresponding to the selectable hotspot, the method further comprises:
  associating the hotspot media object with a hotspot identifier; and
  storing the hotspot identifier and the hotspot information of the hotspot media object.

4. The method of claim 3 wherein associating the cursor with the selectable hotspot includes recording the hotspot identifier associated with the hotspot media object corresponding to the selectable hotspot.

5. The method of claim 4 wherein after receiving the hypervideo stream of the second video frame, the method includes updating the location information of the hotspot media object corresponding to the selectable hotspot with information defining where the second activation region is located in the second video frame.

6. The method of claim 5 wherein after updating the location information of the hotspot media object, the method includes:
  determining that the hotspot identifier of the hotspot media object associated with the updated location information matches the recorded hotspot identifier; and
  determining the second position of the cursor based on the updated location information.

7. The method of claim 2 including providing the hover information of the hotspot media object corresponding to the selectable hotspot when the cursor is associated with the selectable hotspot for the first predetermined time period and the hotspot has not been activated.

8. The method of claim 1 further including:
  receiving the hypervideo stream of a fourth video frame within the second predetermined time period, the fourth video frame associated with the selectable hotspot in a fourth activation region; and
  automatically moving the cursor to another position substantially within the fourth activation region in the fourth video frame based on the maintained association between the cursor and the selectable hotspot.

9. The method of claim 1 wherein prior to automatically moving the cursor to the second position, the method includes:
  determining whether the first position is outside of the second activation region;
  setting the second position at the as one of a closest edge, center, center of gravity, and visual center of the second activation region when the first position is outside of the second region; and
  setting the second position as the first position when the first position is within the second activation region.

10. The method of claim 1 including disassociating the cursor with the selectable hotspot in response to receiving one of a command, a request, and an indication to unlock the cursor.

11. A system for automatically linking a cursor to a hotspot in a hypervideo stream, wherein the hypervideo stream comprises a plurality of video frames that are associated with at least one selectable hotspot, the system comprising components including:
  a hypermedia player component configured for receiving a hypervideo stream of a first video frame, the first video frame associated with a selectable hotspot in a first activation region of the first video frame; and
  a graphical user interface manager component for processing a position of a cursor, wherein the hypermedia player component is configured for determining whether a first position of the cursor is substantially within the first activation region corresponding to the selectable hotspot, for associating the cursor with the selectable hotspot when the first position of the cursor is substantially within the first activation region corresponding to the selectable hotspot in the first video frame, for receiving the hypervideo stream of a second video frame, the second video frame associated with the selectable hotspot in a second activation region, wherein the second activation region is different from the first activation region, and wherein the graphical user interface manager component is configured for automatically moving the cursor to a second position substantially within the second activation region in the second video frame based on the association between the cursor and the selectable hotspot, wherein the second position is at a closest edge of the second activation region;

wherein an interaction manager component is configured for, when the hypervideo stream of a third video frame is received and the selectable hotspot is not associated with the third video frame, maintaining the association between the cursor and the selectable hotspot for a second predetermined time period, and for performing the action indicated by the action information of the hotspot media object corresponding to the selectable hotspot when the hotspot is activated within the second predetermined time period;

wherein at least one of the components include at least one processor configured for implementing the at least one components.

12. The system of claim 11 wherein the hypermedia player component includes:

a demultiplexer component configured for receiving and separating the hypervideo stream into a plurality of component parts including a hotspot media object corresponding to the selectable hotspot, wherein the hotspot media object includes hotspot information comprising location information defining where the activation region corresponding to the selectable hotspot is located in the video frame; and the interaction manager component configured for associating the hotspot media object with a hotspot identifier, for storing the hotspot identifier and the hotspot information of the hotspot media object, for recording the hotspot identifier of the hotspot media object corresponding to the selectable hotspot associated with the cursor, for updating the hotspot information when the second video frame is received and separated, for determining the second position of the cursor based on the updated location information, and for disassociating the cursor with the selectable hotspot in response to receiving one of a command, a request, and an indication to unlock the cursor.

13. The system of claim 12 wherein the hotspot information includes at least one of action information indicating an action to perform when the hotspot is activated and hover information to be provided when the cursor is positioned substantially within the activation region corresponding to the selectable hotspot for a first predetermined time period, and the interaction manager component is configured for at least one of providing the hover information of the hotspot media object corresponding to the selectable hotspot when the cursor is associated with the selectable hotspot for the first predetermined time period and the hotspot has not been activated, and performing the action indicated by the action information of the hotspot media object corresponding to the selectable hotspot when the hotspot is activated.

14. The system of claim 11 wherein when the hypervideo stream of a fourth video frame is received within the second predetermined time period and the fourth video frame is associated with the selectable hotspot in a fourth activation region, the interaction manager component is configured for automatically moving the cursor to another position substantially within the fourth activation region in the fourth video frame based on the maintained association between the cursor and the selectable hotspot.

15. A non-transitory computer readable medium containing a computer program, executable by a machine, for automatically linking a cursor to a hotspot in a hypervideo stream, wherein the hypervideo stream comprises a plurality of video frames that are associated with at least one selectable hotspot, the computer program comprising executable instructions for:

receiving a hypervideo stream of a first video frame, the first video frame associated with a selectable hotspot in a first activation region of the first video frame;

determining whether a first position of a cursor is substantially within the first activation region corresponding to the selectable hotspot;

associating the cursor with the selectable hotspot when the first position of the cursor is substantially within the first activation region corresponding to the selectable hotspot in the first video frame;

receiving the hypervideo stream of a second video frame, the second video frame associated with the selectable hotspot in a second activation region, wherein the second activation region is different from the first activation region;

automatically moving the cursor to a second position substantially within the second activation region in the second video frame based on the association between the cursor and the selectable hotspot, wherein the second position is at a closest edge of the second activation region;

receiving the hypervideo stream of a third video frame, wherein the selectable hotspot is not associated with the third video frame;

maintaining the association between the cursor and the selectable hotspot for a second predetermined time period; and performing an action corresponding to the selectable hotspot when the selectable hotspot is activated within the second predetermined time period.

* * * * *